Figure 2:
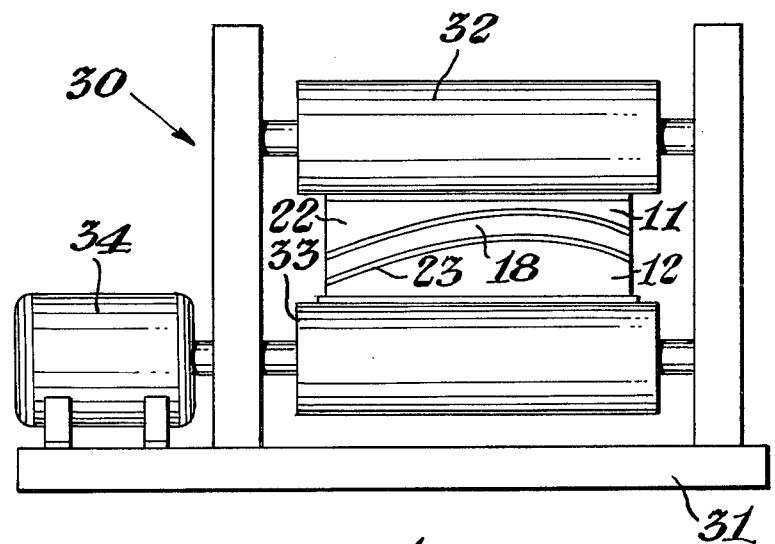

United States Patent [19]

Palfey et al.

[11] 4,199,389

[45] Apr. 22, 1980

[54] METHOD OF MAKING CURVED LAMINATED PANELS

[75] Inventors: Albert J. Palfey, Midland; William P. Hovey, Mt. Pleasant, both of Mich.

[73] Assignee: The Dow Chemical Company, Midland, Mich.

[21] Appl. No.: 690,229

[22] Filed: May 26, 1976

[51] Int. Cl.² .......................................... B32B 31/20
[52] U.S. Cl. .................................. 156/196; 144/256; 144/282; 144/283; 156/222; 156/228; 156/245
[58] Field of Search ............... 156/196, 197, 198, 212, 156/221, 222, 224, 228, 242, 245, 288, 580, 581, 582; 100/155 R, 176, 210, 212, 295; 425/328, 394, 395, 406, 408, 411, 518, 519, 520, 521; 264/239, 241, 251, 253, 284, 285, 286, 293; 144/2 A, 283, 256, 282, 321, 328

[56] References Cited

U.S. PATENT DOCUMENTS

| | | | |
|---|---|---|---|
| 272,663 | 2/1883 | Durant | 144/256 |
| 601,993 | 4/1898 | Wittkowsky | 144/256 |
| 3,878,015 | 4/1975 | Johnston | 156/222 |

*Primary Examiner*—Caleb Weston
*Attorney, Agent, or Firm*—R. B. Ingraham

[57] ABSTRACT

Curved laminated sandwich panels having a plastic foam core and surface skins are prepared by applying pressure sensitive adhesive to at least one of adjacent faces to be joined, interposing a slip sheet between adjacent surfaces of the sheets to be laminated, positioning the sheets to be laminated within a matched die mold, removing the slip sheets and passing the matched die mold through pressure rolls to deform the sheets and conform them to the shape of the mold.

4 Claims, 2 Drawing Figures

U.S. Patent  Apr. 22, 1980  4,199,389

METHOD OF MAKING CURVED LAMINATED PANELS

Foam core sandwich panels are widely used in construction of specialized vehicle bodies, buildings, enclosures, and the like. Oftentimes, it is desirable to have curved laminate panels having a plastic foam core. Many techniques have been developed for the preparation of curved sandwich panels. One of the more common is to apply skins or facing sheets to the core, bend the entire assembly to the desired configuration and cure an adhesive between the skins and the cores; subsequently, the cured laminate is removed from the restraining configuration to provide a curved panel. Another common way of preparing a curved foamed laminated structure is to laminate one facing sheet to the foamed core, bend the resulting laminate in such a way that the adhered facing sheet is on the convex side of the bent panel. A second facing sheet is then laminated to the concave side. Such a technique utilizes the tensile strength of the skin or facing sheet and crushes the foam core in the region of the curve. Some plastic foam laminates and applications therefore are shown in U.S. Pat. Nos. 2,770,406; 2,980,279; 3,189,243; 3,284,260; and 3,687,774.

Oftentimes it is desirable to form sandwich panels which are relatively large, for example, a panel eight feet in width and twenty feet in length. Such a panel might be used for a vehicle body, small building or the like. In order to obtain the desired curvature reliably and reproducibly, matched die molding is oftentimes employed. However, when using matched die molding, oftentimes presses having a large platen area and required clamping force are acquired only at great expense.

It would be desirable if there were available an improved method for the matched die shaping of foam core sandwich panels.

It would also be desirable if there were available an improved method for the lamination of curved foam core sandwich panels which did not require a platen press.

It would also be desirable if there were available an improved method for the preparation of foam core sandwich panels of large size that required minimal equipment investment.

These benefits and other advantages in accordance with the present invention are achieved in a method for the preparation of a foam core sandwich panel having a curved portion therein, the steps of the method comprising disposing between a pair of matched dies a core of foam synthetic resinous material having first and second major opposed faces, a first skin or facing sheet adjacent the first major face of the core, a second facing sheet adjacent the second major face of the core, first and second pressure sensitive adhesive layers disposed adjacent the first and second major surfaces of the core, respectively, pressing the core, facing sheets and adhesive layers between matched dies to cause the foam facing sheets and adhesive layers to conform to the matched dies and adhere together to form a curved laminated foam core sandwich panel, the improvement which comprises applying pressure to the matched die core facing sheets and adhesive by means of passing the matched die between opposed pressure rolls.

Figure 1:
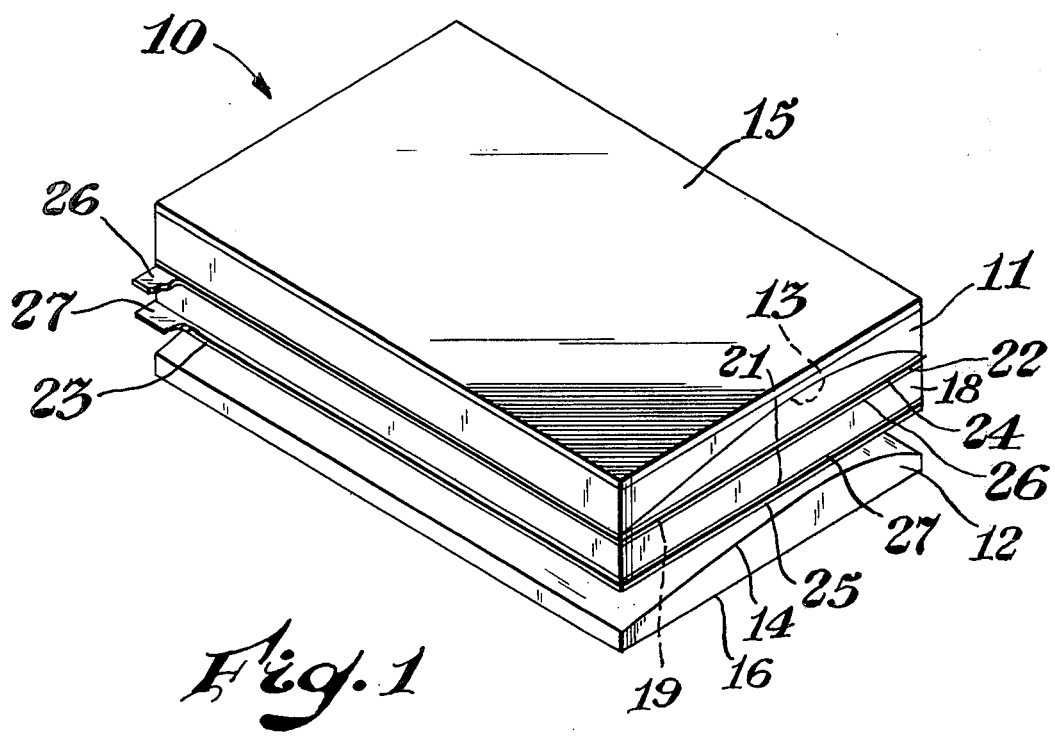

Further features and advantages of the present invention will become more apparent from the following specification taken in connection with the drawing wherein:

FIG. 1 schematically depicts matched dies and components to be laminated;

FIG. 2 is an end view of a lamination operation in accordance with the present invention.

In FIG. 1 there is a schematic representation of a laminate assembly generally designated by the reference numeral 10. The assembly 10 comprises matching dies 11 and 12 which are oppositely disposed. The die 11 has a concave molding surface configuration 13. The die 12 has a matching convex molding surface configuration 14. The die 11 beneficially has a backing sheet or base 15. The die 12 has a backing sheet or base 16. Between the matching dies 11 and 12 is disposed a foam plastic core 18. The core 18 has first and second major surfaces 19 and 21 respectively. A first facing sheet 22 is disposed adjacent to, and is generally coextensive with surface 19. A second facing sheet 23 is generally coextensive with, and adjacent to face 21. A first layer of pressure sensitive adhesive 24 is disposed between facing sheet 22 and major face 19 of the core 18. A second layer of pressure sensitive adhesive 25 is interposed between face 21 of core 18 and facing sheet 23. A first slip sheet 26 is also disposed between the first facing sheet 22 at surface 19 of core 18. A second slip sheet 27 is similarly disposed between the second facing sheet and the core 18.

In FIG. 2 there is depicted a pressure roll assembly generally designated by the reference numeral 30. The pressure roll assembly 30 comprises a frame 31. Rotatably supported on frame 31 is a first or idler roll 32 and a second or driven roll 33, the driven roll 33 being driven by motor 34. Disposed between rolls 32 and 33 are matched die mold portions 11 and 12 having therebetween curved core 18, having disposed on either side thereof facing sheets 22 and 23. The rolls 32 and 33 have applied to the matched die sufficient pressure to cause the foam core and facing sheets to conform to the mold surfaces and cuse adhesion of the facing sheets to the core. The method of the invention is particularly suited for the preparation of panels having single or cylindrical curvature. It is also applicable to the preparation of compound or doubly curved panels if the facing sheets are capable of the required deformation. The facing sheet core and adhesive requirements are generally commensurate with those required for press matched die formation of sandwich panels using pressure sensitive adhesives.

In the practice of the method of the present invention, generally it is convenient to apply pressure sensitive adhesive by any conventional application technique including brushing, rolling and the like and most advantageously by spraying onto one of the surfaces to be joined. It is usually convenient to apply the pressure sensitive adhesive to the foam core. To aid in assembly one or more slip sheets beneficially are used such as the slip sheets 26 and 27. Beneficially, the slip sheets may be of any convenient material. Polyethylene sheet having a thickness of from 4 to about 0.006 inch is a convenient and inexpensive material that can be used with benefit as a slip sheet. Kraft paper is also useable for slip sheets. Oftentimes, it is desirable to first place the lowermost of the facing sheets on the lowermost of the matched dies, disposed the first slip sheet over the lowermost of the facing sheets, apply the foam core, another slip sheet and the uppermost of the slip sheets. When alignment of the facing sheets and core is obtained, slip sheets can then be removed and the remaining half of the matched die applied. The entire assembly, that is, die and sheets, can then be passed through pressure rolls to cause deformation of the facing sheets and core as well as bond the facing sheets and core together. The amount of pressure employed will depend on the particular configuration of the matched dies, the thickness and flexibility of the mating dies as well as the physical properties of the core. Generally dies for use in the present invention may be of relatively lightweight material, for example, the backing members such as the members 15 and 16 of FIG. 1 may be of ¼ inch thick plywood, while the die itself may be of a plastic foam having a compressive strength equal to but preferably more than the compressive strength of a foam core such as the core 18. Very satisfactory bonds are obtained between polystyrene foam, aluminum facing sheets and plywood facing sheets when sufficient pressure is applied by the rolls to cause a 5 to 10 percent compression in the core. For many plastic foams, satisfactory lamination is obtained when pressures are from about 30 to 50 pounds per square inch in the region of the nip between the rolls. Employing the method of the present invention, relatively large curved sheets are readily prepared employing lightweight dies and pressure rolls. Altough lamination has been described wherein the rolls and dies are disposed horizontally, the method of the invention can also be successfully employed with rolls and dies vertically disposed.

As is apparent from the foregoing specification, the present invention is susceptible of being embodied with various alternations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the preparation of a foam core sandwich panel having a curved portion therein, the steps of the method comprising disposing between a pair of matched dies a core of foam synthetic resinous material having first and second major faces, a first skin or facing sheet adjacent the first major face of the core, a second facing sheet adjacent the second major face of the core, first and second pressure sensitive adhesive layers disposed adjacent the first and second major surfaces of the core, respectively, pressing the core, facing sheets and adhesive layers between matched dies to cause the foam facing sheets and adhesive layers to conform to the matched dies and adhere together to form a curved laminated foam core sandwich panel, the improvement which comprises applying pressure to the matched dies core facing sheets and adhesive by means of passing the matched dies between opposed pressure rolls.

2. The method of claim 1 wherein the matched dies comprise a plastic foam.

3. The method of claim 1 wherein sufficient pressure is applied by the rolls to cause from about 5 to about 10 percent compression of the core.

4. The method of claim 3 wherein the molds comprise a plastic foam.

* * * * *